(12) United States Patent
Roche et al.

(10) Patent No.: US 7,485,268 B2
(45) Date of Patent: Feb. 3, 2009

(54) PRODUCTION OF TITANIA

(75) Inventors: Eric Girvan Roche, Shortland (AU); Alan David Stuart, Shortland (AU); Ernest Philip Grazier, Shortland (AU); Houyuan Liu, Shortland (AU)

(73) Assignee: BHP Billiton Innovation Pty. Ltd., Melbourne (AU)

( * ) Notice: Subject to any disclaimer, the term of this patent is extended or adjusted under 35 U.S.C. 154(b) by 0 days.

(21) Appl. No.: 10/531,804

(22) PCT Filed: Oct. 17, 2003

(86) PCT No.: PCT/AU03/01385

§ 371 (c)(1), (2), (4) Date: Jan. 26, 2006

(87) PCT Pub. No.: WO2004/035842

PCT Pub. Date: Apr. 29, 2004

(65) Prior Publication Data

US 2006/0153768 A1 Jul. 13, 2006

(30) Foreign Application Priority Data

Oct. 18, 2002 (AU) .............................. 2002952155

(51) Int. Cl.
*C01G 23/047* (2006.01)

(52) U.S. Cl. ............................. 423/70; 423/82; 423/85; 423/86; 423/610; 423/615; 423/616

(58) Field of Classification Search .................. 423/70, 423/82, 85, 86, 610, 615, 616
See application file for complete search history.

(56) References Cited

U.S. PATENT DOCUMENTS

| | | | |
|---|---|---|---|
| 3,067,010 A | 12/1962 | Long et al. | |
| 3,760,058 A | 9/1973 | Langmesser et al. | |
| 4,275,040 A | 6/1981 | Davis | |
| 4,288,415 A | 9/1981 | Rahm et al. | |
| 4,288,416 A | 9/1981 | Davis et al. | |
| 4,288,418 A * | 9/1981 | Davis et al. | 423/83 |
| 4,986,742 A | 1/1991 | Denecker et al. | |
| 5,277,816 A | 1/1994 | Watanabe | |
| 5,744,108 A * | 4/1998 | Holle et al. | 423/74 |
| 5,821,186 A * | 10/1998 | Collins | 502/8 |
| 6,048,505 A | 4/2000 | Miller et al. | |
| 6,375,923 B1 | 4/2002 | Duyvesteyn et al. | |
| 2005/0180903 A1 | 8/2005 | Roche et al. | |
| 2006/0153768 A1 | 7/2006 | Roche et al. | |
| 2006/0177363 A1 | 8/2006 | Roche et al. | |
| 2006/0233686 A1 | 10/2006 | Roche et al. | |

FOREIGN PATENT DOCUMENTS

| | | |
|---|---|---|
| CA | 2014485 A1 | 10/1990 |
| CA | 1293356 | 12/1991 |
| CA | 2431257 A1 | 6/2002 |
| JP | 05009029 | 1/1993 |
| WO | WO 02/48412 A1 | 6/2002 |
| WO | WO 2004/035841 A1 | 4/2004 |
| WO | WO 2004/035843 A1 | 4/2004 |
| WO | WO 2004035842 A1 | 4/2004 |
| WO | WO 2005038060 A1 | 4/2005 |
| WO | WO 2006105611 A1 | 10/2006 |
| WO | WO 2006105612 A1 | 10/2006 |
| WO | WO 2006105613 A1 | 10/2006 |
| WO | WO 2006105614 A1 | 10/2006 |

OTHER PUBLICATIONS

International Search Report of International Application No. PCT/AU03/01385, dated Dec. 15, 2003, 3 pages.
Roche et al., U.S. Application entitled "Titanium Intermediate Processing", U.S. Appl. No. 11/868,676, filed Oct. 8, 2007.
Roche et al., U.S. Application entitled "Operating Titanium Precipitation Process", U.S. Appl. No. 11/868,684, filed Oct. 8, 2007.
Roche et al., U.S. Application entitled "Metal Extraction", U.S. Appl. No. 11/868,689, filed Oct. 8, 2007.
Roche et al., U.S. Application entitled "Titanium Precipitation Process", U.S. Appl. No. 11/868,703, filed Oct. 8, 2007.

* cited by examiner

*Primary Examiner*—Steven Bos
(74) *Attorney, Agent, or Firm*—Brinks Hofer Gilson & Lione; G. Peter Nichols (57) ABSTRACT

A sulfate process for producing titania from a titaniferous material is disclosed. The process includes leaching the titaniferous material and producing a leach liquor, separating titanyl sulfate from leach liquor, hydrolysis of the extracted titanyl sulfate, and thereafter calcining the solid phase produced in the hydrolysis step. The process is characterised by controlling the hydrolysis step and forming a selected particle size distribution of hydrated titanium oxides from titanyl sulfate.

27 Claims, 2 Drawing Sheets

PRODUCTION OF TITANIA

The present invention relates to a process for producing titania from a titaniferous material.

The term "titaniferous" material is understood herein to mean any titanium-containing material, including by way of example ores, ore concentrates, and titaniferous slags.

The present invention relates particularly to the sulfate process for producing titania from titaniferous material.

The sulfate process was the first commercial process for the manufacture of titania from titaniferous ores, such as ilmenite.

A significant issue with the sulfate process is that it produces large quantities of waste iron sulfate and consumes large quantities of sulfuric acid.

The chloride process generally avoids the iron sulfate waste problem of the sulfate process and, at larger scales, is less expensive to operate than the sulfate process.

Hence, the chloride process is the currently preferred process for producing titania, particularly titania for the pigment industry.

An object of the present invention is to provide an improved sulfate process.

In general terms, the present invention provides a sulfate process for producing titania from a titaniferous material (such as ilmenite) which includes includes the steps of:

(a) leaching the solid titaniferous material with a leach solution containing sulfuric acid and forming a leach liquor that includes an acidic solution of titanyl sulfate ($TiOSO_4$) and iron sulfate ($FeSO_4$);

(b) separating the leach liquor and a residual solid phase from the leach step (a);

(c) separating titanyl sulfate from the leach liquor from step (b);

(d) hydrolysing the separated titanyl sulfate and forming a selected particle size distribution of hydrated titanium oxides from titanyl sulfate;

(e) separating the solid phase containing hydrated titanium oxides and a liquid phase that are produced in the hydrolysis step (d); and (f) calcining the solid phase from step (e) and forming titania.

The term "hydrated titanium oxides" is understood herein to include, by way of example, compounds that have the formula $TiO_2.2H_2O$ and $TiO_2.H_2O$.

In addition, the term "hydrated titanium oxides" is understood herein to include compounds that are described in technical literature as titanium hydroxide ($Ti(OH)_4$).

The above-described process is characterized by forming, and more particularly controlling the process so that it is possible to form, the above-mentioned selected particle size distribution of hydrated titanium oxides in the hydrolysis step (d).

Preferably the process includes controlling the hydrolysis step (d) to produce the selected particle size distribution of the hydrated titanium oxides product.

The process may include controlling the hydrolysis step (d) to produce coarse hydrated titanium oxides, ie oxides having a particle size of at least 0.005-0.01 mm (ie 5-10 micron).

The controlled growth of coarse particles of hydrated titanium oxides in the hydrolysis step (d) is a significant departure from the conventional sulfate process in which there is a strong preference for producing fine particles in order to produce fine titania that meets the needs of the pigment industry, the major user of titania.

There are applications, such as electrochemical reduction of titania, in which it is preferable to have a coarse feed of hydrated titanium oxides or a coarse feed, of titania.

Alternatively, the process may include controlling the hydrolysis step (d) to produce fine hydrated titanium oxides, ie oxides having a particle size of less than 0.0003 mm (ie 0.3 micron).

There are other applications, such as production of pigments, in which it is preferable to have a fine feed of hydrated titanium oxides or a fine feed of titania.

One important parameter for controlling crystal growth is the concentration of titanium in solution within reactor 11. Specifically, it is preferred that the concentration be relatively low, of the order of 10 g/l, within reactor 11 to achieve growth rather than nucleation of titanium oxide particles.

Preferably the process includes a further leach step of leaching the residual solid phase from step (b) with a leach solution containing sulfuric acid and forming a leach liquor that includes an acidic solution of titanyl sulfate and iron sulfate and a residual solid phase.

Preferably the further leach step includes separating the leach liquor and the residual solid phase from the further leach step.

Preferably the further leach step includes supplying the separated leach liquor to the leach step (a) and/or mixing the separated leach liquor with the leach liquor from step (b).

The leach step (a) and the further leach step may be carried out in the same vessel.

In that event, the further leach step includes returning the residual solid phase from step (b) to the vessel, wherein the residual solid phase forms part of the titaniferous material subjected to leaching in step (a).

Alternatively, the leach step (a) and the further leach step may be carried out in separate, with the residual solid phase from step (b) being supplied to the vessel or vessels for the further leach step.

In that event, preferably the process includes separating the leach liquor and a further residual solid phase formed in the further leach step.

The separated leach liquor may be supplied to the leach step (a).

Alternatively, the separated leach liquor may be mixed with the leach liquor from step (b) and thereafter the mixed leach liquor may be processed in the subsequent steps of the process.

The leach step (a) and/or the further leach step may be carried out on a continuous basis or a batch basis.

The applicant has found in experimental work that it is important to carry out the leach step (a) and/or the further leach step under leach conditions, described herein, that avoid an undesirable amount of premature hydrolysis of hydrated titanium oxides.

In addition, the applicant has found in experimental work that it is important to carry out the leach step (a) and/or the further leach step under leach conditions that avoid an undesirable amount of premature precipitation of titanyl sulfate.

Preferably the leach step (a) and/or the further leach step include selecting and/or controlling the leach conditions in the leach step (a) and/or the further leach step to avoid undesirable amounts of premature hydrolysis of hydrated titanium oxides and undesirable amounts of premature precipitation of titanyl sulfate.

The relevant leach conditions include any one or more than one of acid concentration, leach temperature and leach time.

Typically, the acid concentration in the leach step (a) and/or the further leach step should be at least 350 g/l sulfuric acid throughout the leach step (a) and/or the further leach step when operating at a leach temperature in the range of 95° C. to the boiling point in order to avoid premature hydrolysis.

Typically, the acid concentration at the end of the leach step (a) and/or the further leach step should be less than 450 g/l when operating at a leach temperature in the range of 95° C. to the boiling point in order to avoid an undesirable amount of premature precipitation of titanyl sulfate.

It is noted that the acid concentration at the start of the leach step could be higher, typically as high as 700 g/l.

Typically, the leach conditions should be selected and/or controlled so that the titanium ion concentration in the leach liquor is less than 50 g/l in the leach liquor at the end of the leach step (a) and/or the further leach step.

Preferably the titanium ion concentration in the leach liquor is 40-50 g/l.

Preferably the process includes carrying out the leach step (a) in the presence of an additive that accelerates the rate of leaching the titaniferous material.

Preferably the process includes carrying out the further leach step in the presence of an additive that accelerates the rate of leaching the titaniferous material.

The use of the leaching accelerant makes it possible to use less concentrated sulfuric acid than is required for the conventional sulfate process.

Preferably the leaching accelerant is selected from a group that includes iron, a titanium (III) salt, a thiosulfate salt, sulfur dioxide or any other reduced sulfur containing species.

Preferably the process includes carrying out the leach step (a) in the presence of a reductant that reduces ferric ions to ferrous ions in the acidic solution of titanyl sulfate and iron sulfate produced in the leach step (a).

Preferably the process includes carrying out the further leach step in the presence of a reductant that reduces ferric ions to ferrous ions in the acidic solution of titanyl sulfate and iron sulfate produced in the leach step (a).

The reductant may be any suitable reductant.

Preferably the reductant is selected from a group that includes iron, a titanium (III) salt, a thiosulfate salt, sulfur dioxide or any other reduced sulfur containing species.

As is indicated above, the purpose of the reductant is to minimise the amount of iron in the trivalent ferric form and to maximise the amount of iron in the divalent ferrous form in the leach liquor produced in the leach step (a) and/or the further leach step. Maximising the amount of iron in the divalent ferrous form minimises the equilibrium concentrations of iron in the circuit, by promoting the precipitation of ferrous sulfate $FeSO_4.7H_2O$.

Preferably the process includes the steps of precipitating iron sulfate from the leach liquor from step (b) and separating precipitated iron sulfate from the leach liquor prior to the titanyl sulfate separation step (c).

Preferably the process includes using at least part of the leach liquor remaining after separation of titanyl sulfate in step (c) as at least part of the leach solution in the leach step (a) and/or in the further leach step.

The use of the depleted leach liquor from the titanyl sulfate separation step (c) as the leach solution for leach step (a) and/or the further leach step is an advantage of the process because it maximises the effective use of acid in the process.

Preferably the titanyl sulfate separation step (c) includes a solvent extraction step of extracting titanyl sulfate from the leach liquor from step (b) into a solvent and thereafter stripping titanyl sulfate from the solvent and forming a solution that contains titanyl sulfate and thereafter hydrolysing the titanyl sulfate-containing solution in the hydrolysis step (d).

In a situation in which the titanyl sulfate separation step (c) is a solvent extraction step, preferably the process includes using at least part of a raffinate from the solvent extraction step as at least part of the leach solution in leach step (a) and/or in the further leach step.

Preferably the leach solution in the leach step (a) and the further leach step includes the raffinate and make-up fresh sulfuric acid.

Preferably the raffinate from the solvent extraction step has an acid concentration of at least 250 g/l sulfuric acid.

Preferably the raffinate from the solvent extraction step has an acid concentration of at least 350 g/l sulfuric acid.

Preferably the solvent extraction step includes contacting the leach liquor from step (b) with the solvent including a modifier.

The term "solvent" is understood herein to mean a reagent and a diluent in combination.

The term "modifier" is understood herein to mean a chemical which changes the solubilising properties of the solvent such that the titanium containing species are soluble in the solvent at higher concentrations than might otherwise be possible.

Preferably the process includes using the liquid phase produced in hydrolysis step (d) as a source of acid or water in other steps of the process. Typically, the liquid phase includes 100-500 g/l sulfuric acid. By way of example, the liquid phase may be used as a source of acid (and titanium values) by direct addition to leach liquor, depleted leach liquor or any one of steps (a) and (b) and the further leach step. By way of further example, the liquid phase may be used as a source of water for washing solid products from any one of steps (b) and (e).

Alternatively, the process may include treating the liquid phase produced in hydrolysis step (d) by neutralising the acid in the liquid phase with lime (CaO) and/or limestone ($CaCO_3$) and producing clean gypsum ($CaSO_4.2H_2O$).

It is known to produce gypsum by neutralising sulfuric acid in the liquid phase of the hydrolysis step in the conventional sulfate process. However, the gypsum product includes levels of impurities that reduce the market value of the gypsum. The liquid phase produced in hydrolysis step (d) also includes sulfuric acid that can be neutralised to produce gypsum. However, advantageously, this liquid phase is relatively free of contaminants because the titanyl sulfate precipitation step does not recover substantial amounts (if any) of species (such as iron, chromium, manganese, and niobium) that are in solution in the leach liquor that could act as contaminants. Therefore, gypsum produced from this leach liquor is relatively pure.

Preferably the process includes separating a bleed stream of the leach liquor to minimise the build-up of species (such as vanadium, chromium, and niobium) in solution in the leach liquor.

The above-described process may be carried out as a continuous process or as a batch process.

Preferably the titaniferous material is ilmenite or altered ilmenite.

According to the present invention there is also provided hydrated titanium oxides that have been produced by leaching a titaniferous material (such as ilmenite) with sulfuric acid and forming a leach liquor that includes an acidic solution of titanyl sulfate and iron sulfate and thereafter hydrolysing titanyl sulfate and is characterised in that the hydrated titanium oxides include coarse particles of at least 0.005 mm (5 micron).

The process of the present invention includes the following typical reactions.

Leaching:

$$FeTiO_3 + 2H_2SO_4 \rightarrow FeSO_4 + TiOSO_4 + 2H_2O$$

Ferric reduction:

$$Fe_2(SO_4)_3 + Fe^\circ \rightarrow 3FeSO_4$$

Ferrous sulfate crystallisation:

$$FeSO_4 + 7H_2O \rightarrow FeSO_4 \cdot 7H_2O$$

Solvent extraction loading:

$$Ti(SO_4)_2 + H_2O + R_3P=O \rightarrow R_3P=O \cdot TiOSO_4 + H_2SO_4$$

Solvent extraction strip:

$$R_3P=O \cdot TiOSO_4 \rightarrow R_3P=O + TiOSO_4$$

Hydrolysis:

$$TiOSO_4 + 2H_2O \rightarrow TiO(OH)_2 + H_2SO_4$$

Calcination:

$$TiO(OH)_2 \rightarrow TiO_2 + H_2O$$

The improved sulfate process of the present invention is described further with reference to the accompanying drawings, of which.

Figure 1:
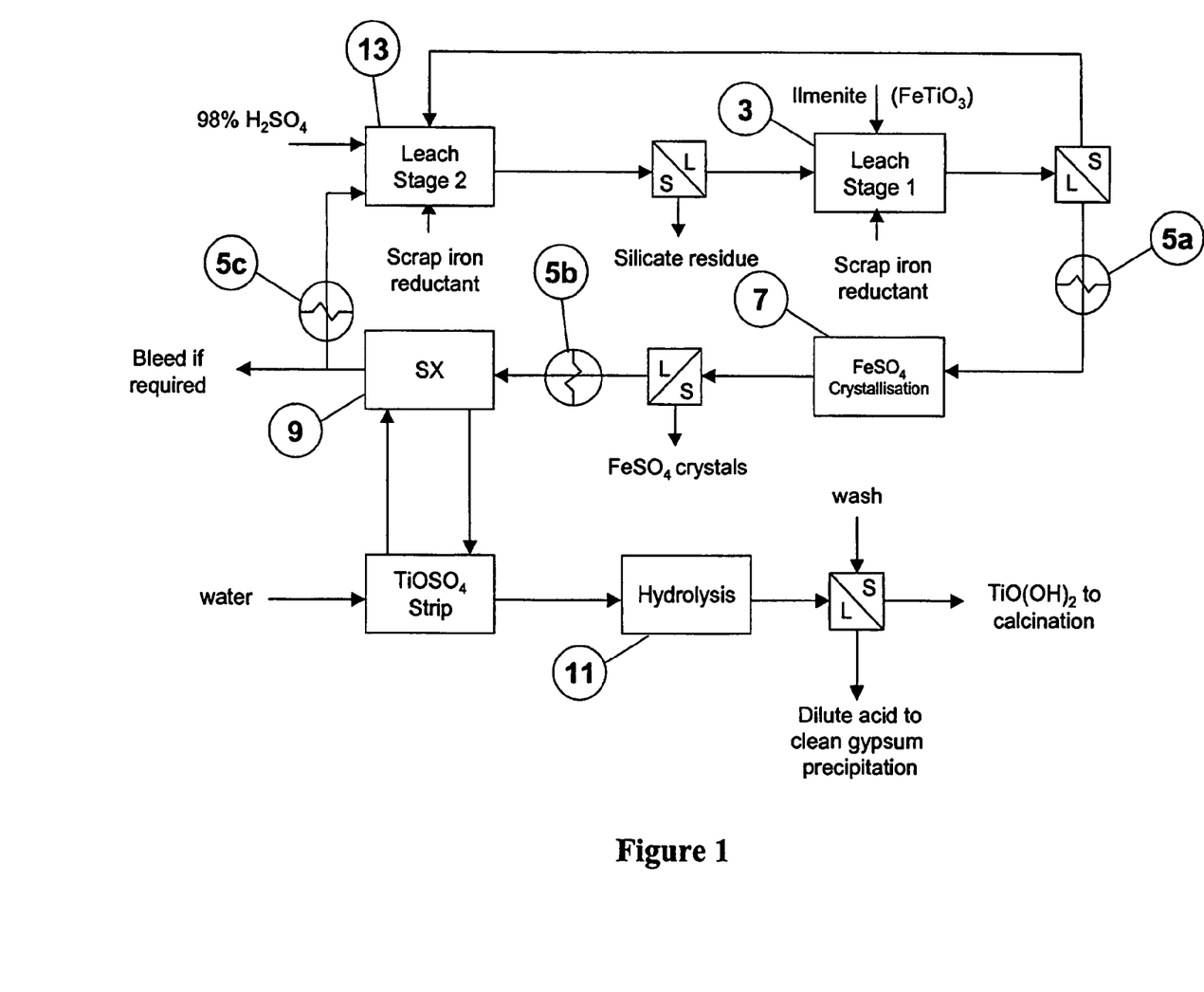
FIG. 1 is a flow sheet that illustrates one embodiment of the process of the invention.

With reference to the flow sheet of FIG. 1, in a Stage 1 Leach step ilmenite, leach liquor containing between 400 and 700 g/l sulfuric acid from a Stage 2 Leach step, and a reductant in the form of scrap iron are supplied to a digester 3. The process operates on a continuous basis with the feed materials being supplied continuously to the digester 3 and reacted and unreacted materials being discharged continuously from the digester 3.

The Stage 1 Leach step solubilises a substantial component of the ilmenite supplied to the digester 3 and produces a leach liquor that contains titanyl sulfate and iron sulfate. Typically, at the end of the leach the leach liquor contains 20-100 and preferably 40-50 g/l titanium and 50-100 g/l iron.

The leach liquor and partially and unreacted ilmenite that are discharged continuously from the digester 3 are subjected to a solid/liquid separation step.

The solid phase from the solid/liquid separation step, which contains unreacted and partially reacted ilmenite, is transferred to the Stage 2 Leach step. The Stage 2 Leach step is discussed further below.

The leach liquor from the solid/liquid separation step is transferred via a heat exchanger 5a to an iron sulfate crystallisation reactor 7.

The heat exchanger 5a cools the leach liquor from a temperature of the order of 110° C. to 60° C. The heat extracted by the heat exchanger 5a is used elsewhere in the process, as discussed further below.

The leach liquor is cooled further, typically to 10-30° C. in the iron sulfate crystallisation reactor 7. Cooling the leach liquor precipitates iron sulfate from the leach liquor in the iron sulfate crystallisation reactor 7. Typically, the crystallisation step reduces the concentration of iron in the leach liquor to 40-50 g/l.

The leach liquor containing precipitated iron sulfate that is discharged from the crystallisation reactor 7 is subjected to a further solid/liquid separation step which separates the precipitated iron sulfate from the leach liquor.

The solid phase from the solid/liquid separation step contains iron sulfate. The solid phase may also contain some species such as iron, manganese and aluminium. The solid phase is a by-product of the process.

The leach liquor from the solid/liquid separation step is transferred via a heat exchanger 5b to a solvent extraction reactor 9 and contacts a suitable solvent that extracts titanyl sulfate from the leach liquor. Typically, the leach liquor from the solid/liquid separation step is at a temperature of the order of 30° C. and the heat exchanger 5b heats the leach liquor to a higher temperature, typically 50° C. Conveniently, the heat input for heat exchanger 5b is heat recovered from the leach liquor by heat exchanger 5a.

Suitable solvents are disclosed in Solex U.S. Pat. No. 5,277,816. The solvents include trioctylphosphine oxide and butyl dibutylphosphonate. The present invention is not confined to these extractants.

The solvent is used in conjunction with a modifier in the solvent extraction step. Suitable modifiers include methyl isobutyl ketone (MIBK), di-isobutyl ketone (DIBK) and isotridecanol (ITA).

The solvent/titanyl sulfate mixture is separated from the leach liquor, and thereafter the titanyl sulfate is stripped from the solvent by water.

The recovered solvent is returned to the solvent extraction reactor 9.

The resultant aqueous solution of titanyl sulfate, which typically includes 10-100 g/l titanium in solution and 50-200 g/l sulfuric acid, is transferred to an hydrolysis reactor 11.

At start-up, the reactor 11 contains a starting solution of sulfuric acid and solids. Typically, the solution contains 10-200 g/l acid and solids density of 10-200 g/l.

The titanyl sulfate solution is added at a controlled rate to the starting solution. The addition of the solution results in the reactor filling up to capacity and thereafter overflowing, whereafter the rate of overflow from the reactor 11 matches the rate of supply of titanyl sulfate solution.

In the reactor 11 the sulfate ions in the titanyl sulfate solution are displaced by hydroxyl ions, with the result that hydrated titanium oxides precipitate from the solution.

The solids in the starting solution act as seed for precipitation. Typically, the solids are hydrated titanium oxide or titanium dioxide particles.

Typically, the residence time of titanyl sulfate solution in the reactor 11 varies between 3 and 12 hours.

Subject to temperature and time conditions and control of solution concentration, there is controlled crystal growth in the hydrolysis reactor 11. Controlled crystal growth provides an opportunity to produce titania that ranges from fine to coarse particle sizes. In particular, controlled crystal growth provides an opportunity to produce coarse titania of greater than 0.005 mm (5 micron) which can be used by way of example in the electrochemical reduction of titania to produce titanium.

The hydrolysis reactor 11 may be operated in batch mode. More preferably, the reactor is operated in continuous mode.

Moreover, if required, make-up water and solids can be added to the reactor 11.

The overflow from the reactor 11 is collected as the product of the reactor 11.

The product from the hydrolysis reactor 11 is subjected to a solid/liquid separation step, which is facilitated by providing wash water.

The solid phase from the solid/liquid separation step, which contains hydrated titanium oxides, is transferred to a calciner (not shown) and is calcined to produce titania. Depending on the circumstances, the solid phase may be calcined at 1000° C. to produce titania.

In view of the efficiency of the solvent extraction step in confining extraction substantially to titanium compounds, typically, the process produces titania of very high purity, ie at least 99 wt. %.

Part or all of the liquid phase from the solid/liquid separation step may be reused in the process, for example as a source of acid in the Stage 2 Leach step and/or as a source of water in washing steps in the process, as permitted by the overall water balance.

Alternatively, the liquid phase from the solid/liquid separation step, which contains sulfuric acid, is neutralised with lime and/or limestone and thereby produces a gypsum product. In view of the efficiency of the solvent extraction step in confining extraction to titanium compounds, the liquid phase contains minimal levels of contaminants (such as iron, vanadium and chromium) and therefore the gypsum is "clean" gypsum that is commercially valuable in applications (such as the manufacture of cement).

The raffinate from the solvent extraction step 9 contains relatively high levels of sulfuric acid (250-700 g/l). The raffinate is transferred to the above-mentioned Stage 2 Leach step and is used as a leach liquor. In effect, the solvent extraction step recovers sulfuric acid and the acid can be used productively in the process. This enables a substantial reduction in waste when compared with the conventional sulfate process. In addition, the use of the raffinate as part of the acid feed for the process reduces the amount of fresh acid that is required in the process.

The Stage 2 Leach step is carried out in a digester 13.

The raffinate, and make-up concentrated sulfuric acid that is also supplied to the digester 13, leach the unreacted and partially reacted ilmenite from the Stage 1 Leach and solubilise approximately 50% of the remaining ilmenite. The raffinate may be preheated using a heat exchanger 5c before being supplied to the digester 13.

The product from the Stage 2 Leach is subjected to a solid/liquid separation step.

The leach liquor from the solid/liquid separation step, which typically contains 400-700 g/l sulfuric acid, is transferred to the Stage 1 Leach, as mentioned above.

The solid phase from the solid/liquid separation step is substantially made up of silicate residue, and is a waste product of the process.

Make-up acid is required for the process since there are acid losses in the separation of iron sulfate from the leach liquor and in the extraction of titanyl sulfate in the solvent extraction step.

The make-up acid may be added at any point in the flow sheet.

The addition of the acid in the Stage 2 Leach step is a preferred addition point because it is thought that the introduction of concentrated acid at this point optimises the opportunity to leach ilmenite, and it is beneficial to maintaining an efficient heat balance.

Figure 2:
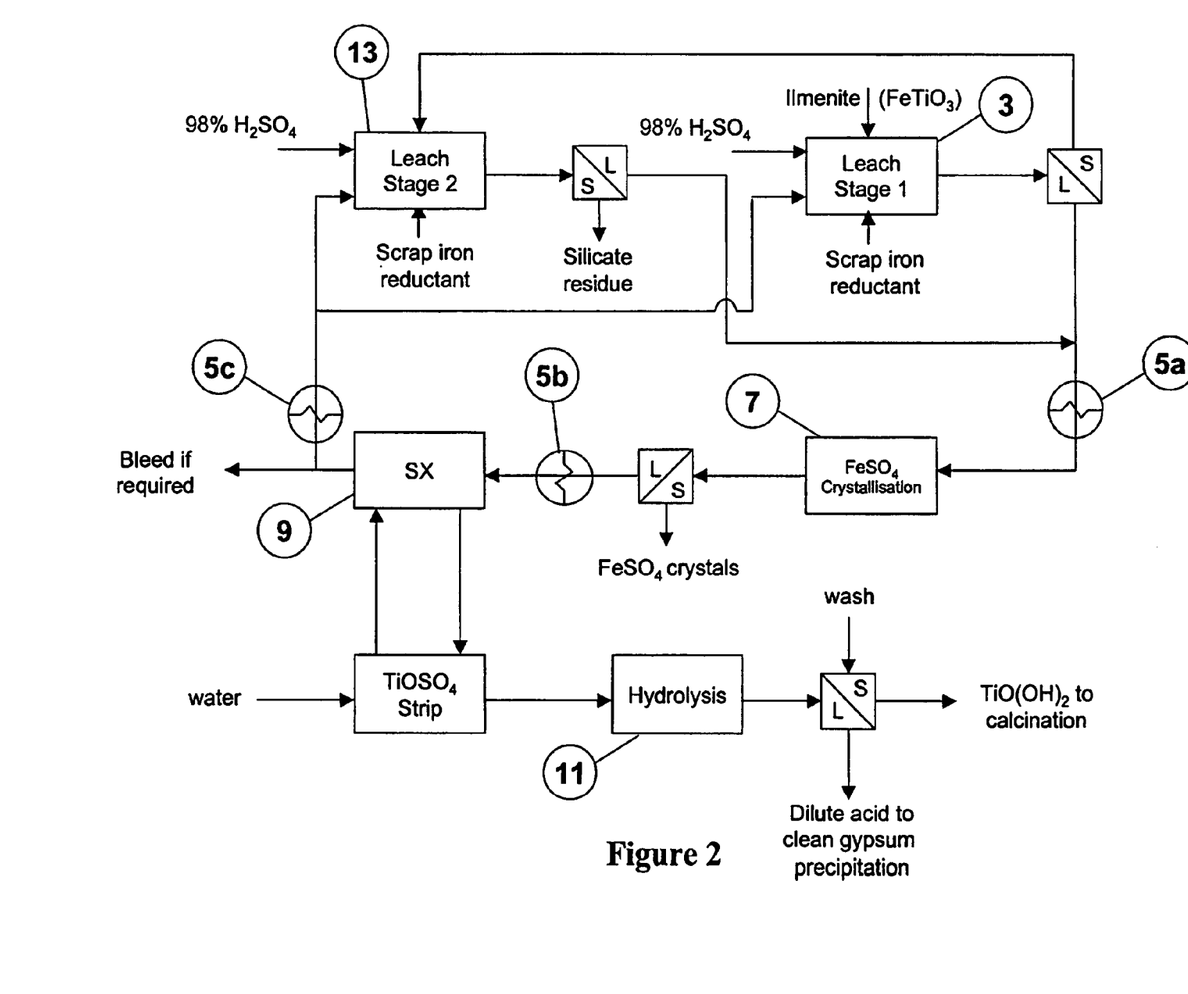
FIG. 2 is a flow sheet that illustrates one embodiment of the process of the invention.

The flow sheet of FIG. 2 is very similar to that shown in FIG. 1 and the same reference numerals are used to describe the same features in both flow sheets.

The main difference between the flow sheets is that, whilst the FIG. 1 flow sheet describes that the raffinate from the solvent extraction step 9 is transferred to the Stage 2 Leach step and is used as a leach solution in that step, in the FIG. 2 flow sheet the raffinate from the solvent extraction step 9 is split into 2 separate streams and is transferred via the separate streams to the Stage 1 Leach step and the Stage 2 Leach step, respectively, and is used as a leach solution in both steps. In addition, whilst the FIG. 1 flow sheet describes that the liquid phase of the product from the Stage 2 Leach step is transferred to the Stage 1 Leach step, in the FIG. 2 embodiment the liquid phase is transferred to the leach liquor produced in the Stage 1 Leach step.

The applicant has carried out experimental work on a laboratory scale and a pilot plant scale in relation to the above-described process.

In summary, the applicant has made the following findings in the experimental scale work.

Fast leaching rates were achieved by leaching ilmenite in the presence of an accelerant, such as scrap iron, sodium thiosulfate, and sulfur dioxide.

Leach liquors containing up to 100 g/l titanium were produced.

The solvent extraction step resulted in a substantial upgrade in purity of titania that was ultimately produced from the titanyl sulfate extracted in the solvent extraction step.

The liquor stripped from the solvent in the solvent extraction step contained high levels (at least 30 g/l) titanyl sulfate.

Raffinate can be used to leach ilmenite in the initial and the further leach steps with or without make-up acid.

Two stage leaching is an effective leaching option, and the two (or more than two) stage leaching can be carried out in a single vessel with return of residual solid phase to the vessel and addition of fresh ilmenite or in multiple vessels with the residual solid phase produced in a $1^{st}$ vessel being supplied to one or more than one other vessel.

There is a leach window (that is dependent on conditions such as acid concentration, leach temperature, and leach time and factors sch as titanium ion concentration) in which it is possible to avoid premature hydrolysis of hydrated titanium oxides and premature precipitation of titanyl sulfate.

The laboratory scale and pilot plant scale work included leaching samples of heavy mineral sands concentrates containing >50% ilmenite.

The leaching work included leaching work on a batch basis in 2 stages at atmospheric pressure with 30-50% w/w sulfuric acid at 95-120° C. for 3-5 hours in each stage, and with additions of accelerant/reductant in the form of iron, sodium thiosulfate and sulfur dioxide in each stage.

The above leaching work was carried out with initial solids loadings of 500 g/l and 200 g/l.

Table 1 is a summary of results of the above leaching work.

TABLE 1

| Solids loading (in Stage 1) | After Stage 1 | After Stage 2 |
| --- | --- | --- |
| 500 g/l | 72% | 87% |
| 200 g/l | 63% | 82% |

Table 1 indicates that 2 stage leaching, under the conditions described above, is an effective leaching option.

The laboratory scale and the pilot plant scale work also included solvent extraction tests on leached ilmenite samples using a range of solvent extraction reagents and modifiers, including reagents of the type disclosed in the U.S. Pat. No. 5,277,816 in the name of Solex Research Corporation of Japan.

The solvent extraction tests were carried out after crystallisation of excess iron sulfate.

The reagents included, by way of example, Cyanex 923 [$(C_8H_{17})_3$PO equivalent] and the aliphatic diluent Shellsol D100A. The modifiers included, by way of example, methyl isobutyl ketone (MIBK), di-isobutyl ketone (DIBK) and isotridecanol (ITA).

Table 2 provides the composition of the feed solution and Table 3 provides titanium enrichment factors in the loaded organic.

TABLE 2

| Ti | 84 g/l | Ni | 28 ppm |
|---|---|---|---|
| Fe | 66 g/l | Si | 8 ppm |
| Mn | 2.2 g/l | Ca | 42 ppm |
| Cr | 87 ppm | Mg | 300 ppm |
| V | 270 ppm | Zn | 66 ppm |

TABLE 3

|  | C923 | Mix 1 | Mix 2 | Mix 3 | Mix 4 |
|---|---|---|---|---|---|
| Ti:Fe | 275 | 450 | 407 | 909 | 1636 |
| Ti:Mn | ~inf. | ~inf. | ~inf. | ~inf. | ~inf. |
| Ti:Cr | ~inf. | ~inf. | ~inf. | ~inf. | ~inf. |
| Ti:V | 4.2 | 6.0 | 4.1 | 4.9 | 6.1 |
| Ti:Ni | 1.4 | ~inf. | ~inf. | ~inf. | ~inf. |
| Ti:Si | 0.14 | ~inf. | ~inf. | ~inf. | ~inf. |
| Ti:Ca | ~inf. | 0.7 | 0.1 | ~inf. | ~inf. |
| Ti:Mg | 11 | ~inf. | ~inf. | ~inf. | ~inf. |
| Ti:Zn | 0.3 | ~inf. | 1.4 | 2.9 | 1.3 |
| Ti (g/l) | 9.1 | 15.0 | 14.0 | 20.0 | 9.0 |

Table 2 indicates that solvent extraction, under the conditions described above, is an effective means of separating titanium (in the form of titanyl sulfate) from contaminants.

The above solvent extraction tests also indicated that solvent extraction is far more effective if a modifier is present. The modifier did not appear to have any effect on the degree of extraction of titanium. However, the modifier appeared to prevent the formation of an undesirable titanium-loaded phase that is not soluble in the diluent. Thus, without the modifier, only relatively dilute solutions of titanium are possible.

The following Examples illustrate further the laboratory scale and pilot plant scale work carried out by the applicant.

EXAMPLE 1

Batch 1$^{st}$ Stage Leach at Constant Acidity 1000 mL of raffinate containing 402 g/l free $H_2SO_4$, 24.6 g/l $Fe^{2+}$, 2.0 g/l $Fe^{3+}$ and 3.3 g/l Ti was preheated to 110° C., in a glass reactor equipped with baffles and a Teflon agitator. 400 g of ilmenite, containing 30.4% Ti and 34.3% Fe and ground to 50% passing 32 μm, was added to this solution with sufficient agitation to fully suspend the solids. A 6 mm mild steel rod was immersed into the slurry at a rate of 0.5 cm/hour. Leaching was carried out for 6 hours. Aliquots of 98% sulfuric acid were added throughout to control the free acidity to 400 g/l. After 6 hours a sample was withdrawn and filtered. Analysis of the solution showed it to contain 397 g/l free $H_2SO_4$, 72.6 g/l $Fe^{2+}$, 3.0 g/l $Fe^{3+}$ and 28 g/l Ti. The slurry was filtered, and the solids washed with water and dried. 252.2 g of residue were obtained in this way, containing 31.9% Ti and 32.7% Fe.

EXAMPLE 2

Batch Two Stage Leach at Constant Acidity 1000 mL of synthetic raffinate containing 402 g/l free $H_2SO_4$ was preheated to 105° C., in a glass reactor equipped with baffles and a Teflon agitator. 400 g of ilmenite, containing 30.4% Ti and 34.3% Fe and ground to 50% passing 32 μm, was added to this solution with sufficient agitation to fully suspend the solids. 30 g of iron filings was added. Leaching was carried out for 5 hours. Aliquots of 98% sulfuric acid were added throughout to control the free acidity to 400 g/l. After 5 hours a sample was withdrawn and filtered. Analysis of the solution showed it to contain 387 g/l free $H_2SO_4$, 89.4 g/l $Fe^{2+}$, 0.4 g/l $Fe^{3+}$ and 48 g/l Ti. Heat and agitation were switched off and the slurry allowed to settle overnight. 750 mL of the clarified solution was removed and replaced with an equal volume of fresh synthetic raffinate. Heat and agitation were reinstated, and 30 g of iron filings were added. Leaching was continued at 110° C. for 5 hours. Aliquots of 98% sulfuric acid were added throughout to control the free acidity to 400 g/l. After 5 hours a sample was withdrawn and filtered. Analysis of the solution showed it to contain 373 g/l free $H_2SO_4$, 106 g/l $Fe^{2+}$, 0.2 g/l $Fe^{3+}$ and 38 g/l Ti. The slurry was filtered, and the solids washed with water and dried. 57.5 g of residue were obtained in this way, containing 33.0% Ti and 23.7% Fe.

EXAMPLE 3

Batch Lot Stage Leach with Reducing Acidity 1000 mL of acidified raffinate containing 598 g/l free $H_2SO_4$, 31.3 g/l $Fe^{2+}$, 2.4 g/l $Fe^{3+}$ and 9.2 g/l Ti was preheated to 110° C., in a glass reactor equipped with baffles and a Teflon agitator. 400 g of ilmenite, containing 30.4% Ti and 34.3% Fe and ground to 50% passing 32 μm, was added to this solution with sufficient agitation to fully suspend the solids. A 6 mm mild steel rod was immersed into the slurry at a rate of 0.5 cm/hour. Leaching was carried out for 6 hours. After 6 hours a sample was withdrawn and filtered. Analysis of the solution showed it to contain 441 g/l free $H_2SO_4$, 73.7 g/l $Fe^{2+}$, 13.0 g/l $Fe^{3+}$ and 47 g/l Ti. The slurry was filtered, and the solids washed with water and dried. 223.6 g of residue were obtained in this way, containing 32.0% Ti and 32.8% Fe.

EXAMPLE 4

Batch 2$^{nd}$ Stage Leach with Reducing Acidity 1000 mL of synthetic raffinate containing 593 g/l free $H_2SO_4$, was preheated to 105° C., in a glass reactor equipped with baffles and a Teflon agitator. 400 g of 1$^{st}$ stage leach residue, containing 32.0% Ti and 31.3% Fe was added to this solution with sufficient agitation to fully suspend the solids. A 6 mm mild steel rod was immersed into the slurry at a rate of 0.5 cm/hour. Leaching was carried out for 6 hours. After 6 hours a sample was withdrawn and filtered. Analysis of the solution showed it to contain 476 g/l free $H_2SO_4$, 29.0 g/l $Fe^{2+}$, 10.4 g/l $Fe^{3+}$ and 32.5 g/l Ti. The slurry was filtered, and the solids washed with water and dried. 267 g of residue were obtained in this way, containing 31.9% Ti and 30.7% Fe.

EXAMPLE 5

Pilot Plant 1$^{st}$ Stage Leach with Reducing Acidity

39 L of 98% sulfuric acid was added to 243 L of raffinate containing 358 g/l free $H_2SO_4$ and 7 g/l Ti, in a fibre reinforced plastic (FRP) tank of 300 L capacity, equipped with a FRP axial turbine. The resulting solution, which contained 579 g/l free acid, 27.9 g/l $Fe^{2+}$ and 5.6 g/l $Fe^{3+}$, was preheated to 95° C. 116 kg of unground ilmenite, containing 31.1% Ti and 34.1% Fe was added to this solution with sufficient agitation to fully suspend the solids. A group of ten 10 mm mild steel rods of length 29 cm was immersed into the slurry. Leaching was carried out for 6 hours at 105° C. The slurry was filtered using a pressure filter, to produce approximately 260 L of solution. Analysis of the solution showed it to contain 461 g/l free $H_2SO_4$, 72.6 g/l $Fe^{2+}$, 9.0 g/l $Fe^{3+}$ and 41 g/l Ti.

EXAMPLE 6

Pilot Plant 1$^{st}$ Stage Leach with Constant Acidity

A single stage leach pilot plant was assembled, consisting of 5 stirred FRP tanks of 10 L capacity each, equipped with FRP double axial turbines, and silica jacketed electric immersion heaters. Ilmenite ground to 50% passing 32 μm was fed to the first tank at 750 g/hour using a screw feeder. SX pilot plant raffinate of composition 404 g/l free $H_2SO_4$, 36.1 g/l $Fe^{2+}$, 3.2 g/l $Fe^{3+}$ and 10 g/l Ti, was also pumped into the first tank at a rate of 62.5 mL/min. The temperature was maintained at 110° C. in all tanks. 98% sulfuric acid was added to the first two tanks to control the acidity to 400 g/l. Mild steel rods of diameter 10 mm were inserted into each tank at a rate of 1 cm/hr. Slurry was thence allowed to flow by gravity to a FRP thickener equipped with FRP rakes. Thickener overflow solution and underflow slurry were collected and stored. The pilot plant was operated continuously for 92 hours. During the final 48 hours of operation the average composition of the solution in each tank was as set out below in Table 4.

TABLE 4

Continuous Pilot Plant 1$^{st}$ Stage Leach Results

| | Free Acid g/l | $Fe^{2+}$ g/l | $Fe^{3+}$ G/l | Ti g/l |
|---|---|---|---|---|
| Tank 1 | 411 | 48 | 2.7 | 16 |
| Tank 2 | 404 | 56 | 2.5 | 20 |
| Tank 3 | 402 | 65 | 2.4 | 29 |
| Tank 4 | 395 | 68 | 4.2 | 36 |
| Tank 5 | 391 | 65 | 6.1 | 34 |
| Thickener overflow | 388 | 70 | 3.0 | 33 |

EXAMPLE 7

SX Bench Tests with Counter-Current Extraction

Three groups of counter-current bench tests were carried out to simulate the SX extraction circuit of the pilot plant operation. Each group involved 5 cycles and the data indicated that a steady state was achieved. The organic phase contained 30% vol Cyanex 923 as the extractant, 5% vol DIBK as the modifier and 65% vol Shellsol D100A as the diluent. At the O/A ratio of 2, 3 and 4, the organic loading was 16, 11 and 8 g/l Ti; the extraction efficiency was 97.8, 99.7 and 99.9%; the titanium concentrations of raffinate were 450-910, 80-120 and 24-28 mg/l respectively. The separation between Ti and Cr, Mg, Mn, Ni approached perfect with the loaded organic containing 0 mg/l of Cr, Mg, Mn and Ni. The test was carried out on flask shaker in an incubator. The major test conditions are shown as follows:

| | |
|---|---|
| Temperature: | 50° C. |
| Mixing time: | 45-60 minutes |
| Settling time: | 15 minutes |
| O/A ratio: | 2, 3, 4 |

The results are summarised in Table 5.

TABLE 5

Composition of Organic, Feed and Raffinate at Given O/A Ratio (mg/l)

| | | $H_2SO_4$ | Ca | Cr | Fe | Mg | Mn | Ni | P | Si | Ti | Y | Zn |
|---|---|---|---|---|---|---|---|---|---|---|---|---|---|
| Feed | | 441000 | 10 | 52 | 39000 | 220 | 1400 | 7 | 0 | 27 | 32000 | 120 | 47 |
| O/A 2 | Org | 28000 | 4 | 0 | 708 | 0 | 0 | 0 | 20200 | 6 | 15600 | 13 | 0 |
| | Raf | 327000 | 14 | 55 | 37200 | 222 | 1500 | 9 | 0 | 76 | 676 | 108 | 47 |
| O/A 3 | Org | 23000 | 1 | 0 | 1920 | 0 | 0 | 0 | 20200 | 5 | 11000 | 12 | 6 |
| | Raf | 314000 | 14 | 55 | 34800 | 224 | 1540 | 9 | 4 | 3 | 89 | 106 | 48 |
| O/A 4 | Org | 22000 | 2 | 1 | 2160 | 0 | 0 | 1 | 20000 | 4 | 8360 | 10 | 0 |
| | Raf | 296000 | 15 | 58 | 34600 | 240 | 1600 | 10 | 7 | 6 | 25 | 100 | 51 |

EXAMPLE 8

SX Bench Stripping Test

The loaded organic that contained 30% vol Cyanex 923 as the extractant, 5% vol DIBK as the modifier and 65% vol Shellsol D100A as the diluent was stripped with water with various O/A ratio. The test was carried out using a flask shaker in an incubator. The major test conditions are shown as follows:

| | |
|---|---|
| Temperature: | 50° C. |
| Mixing time: | 60 minutes |
| Settling time: | 20 minutes |
| O/A ratio: | 1/3, 1/1, 3/1, 5:/1, 10/1, 20/1 and 30/1 |

The results are summarised in Table 6.

TABLE 6

Composition of Organic and Stripping Solution at Given O/A Ratio (mg/l)

|  |  | $H_2SO_4$ | Ca | Cr | Fe | Mg | Mn | Ni | P | Si | Ti | Y | Zn |
|---|---|---|---|---|---|---|---|---|---|---|---|---|---|
| Loaded Organic |  | n.a | 13 | 0 | 44 | 3 | 0 | 0 | 20000 | 4 | 18000 | 12 | 8 |
| O/A 1/3 | Org | n.a | 14 | 0 | 47 | 3 | 0 | 0 | 21000 | 5 | 3400 | 8 | 19 |
|  | Strip * | 14700 | 2 | 0 | 16 | 0 | 0 | 0 | 6 | 0 | 3800 | 3 | 0 |
| O/A 1/1 | Org | n.a | 14 | 0 | 18 | 0 | 0 | 0 | 20000 | 6 | 11000 | 12 | 10 |
|  | Strip | 44100 | 2 | 37 | 0 | 0 | 0 | 0 | 7 | 0 | 7200 | 6 | 1 |
| O/A 3/1 | Org | n.a | 12 | 0 | 16 | 0 | 0 | 0 | 20000 | 5 | 15000 | 13 | 9 |
|  | Strip | 103000 | 2 | 0 | 97 | 0 | 0 | 0 | 7 | 0 | 8000 | 7 | 2 |
| O/A 5/1 | Org | n.a | 13 | 0 | 30 | 4 | 0 | 0 | 20000 | 4 | 16000 | 17 | 25 |
|  | Strip | 156900 | 0 | 0 | 160 | 0 | 0 | 0 | 3 | 0 | 7200 | 7 | 0 |
| O/A 10/1 | Org | n.a | 3 | 0 | 26 | 3 | 0 | 0 | 20000 | 0 | 17000 | 18 | 20 |
|  | Strip | 225600 | 2 | 0 | 280 | 0 | 0 | 0 | 0 | 0 | 5800 | 6 | 3 |
| O/A 20/1 | Org | n.a | 0 | 0 | 40 | 2 | 0 | 0 | 20000 | 0 | 17000 | 17 | 20 |
|  | Strip | 343000 | 4 | 0 | 490 | 0 | 0 | 0 | 0 | 1 | 4700 | 8 | 0 |
| O/A 30/1 | Org | n.a | 10 | 0 | 41 | 0 | 0 | 0 | 19000 | 0 | 17000 | 15 | 6 |
|  | Strip | 392300 | 2 | 1 | 710 | 0 | 0 | 0 | 0 | 0 | 4500 | 7 | 2 |

* White precipitation formed in both organic and aqueous phase

EXAMPLE 9

SX Pilot Plant Operation

The pilot plant operation was carried out with a device that involved two extraction cells, one scrub cell and four stripping-cells. The effective volume of mixer and settler of each cell were 1.675 and 8.000 liter respectively. The stripping involved two stages: the lead strip with hydrolysis thickener overflow and lag stripping with water respectively. The major operational conditional were as follows:

| Temperature: | 50° C. |
|---|---|
| Organic Composition: | 25% v/v Cyanex 923, 5% v/v Iso-tri-decanol and 70% v/v ShellSol D100A. |
| | The capacity of organic was 15.7 g/l Ti. |
| Feed Composition: | 36 g/l Ti, 410 g/l $H_2SO_4$, 47 g/l Fe including 4.0 g/l $Fe^{3+}$ |
| Mixing time: | 5-10 minutes |
| Settling time: | 40 minutes |
| O/A flow ratio of extraction: | ~5:1. Organic flow: 165 mL/min; |
| Feed flow: | 33 mL/min |
| O/A flow ratio of scrub: | ~10:1. |
| Org. flow: | 165 mL/min; |
| Aqu. flow: | 17 mL/min |
| O/A flow ratio of lead strip: | ~4:1. |
| Org. flow: | 165 mL/min; |
| Aqu. flow: | 41 mL/min |
| O/A flow ratio of lag strip: | ~8:1. |
| Org. flow: | 165 mL/min; |
| Aqu. Flow: | 21 mL/min |

The results are summarised in Table 7.

TABLE 7

Average Compositions of Aqueous and Organic Liquor

|  | $H_2SO_4$ g/l | Ca mg/l | Cr mg/l | Tot. Fe g/l | $Fe^{3+}$ mg/l | Mg mg/l | Mn mg/l | Ni mg/l | P mg/l | Si mg/l | Ti mg/l | V mg/l | Zn mg/l |
|---|---|---|---|---|---|---|---|---|---|---|---|---|---|
| Feed | 410 | 58 | 43 | 47000 | 4000 | 430 | 1900 | 4 | 22 | 17 | 36000 | 200 | 41 |
| Raff | 345 | 48 | 29 | 30529 | 5700 | 319 | 1371 | 4 | 2 | 10 | 5324 | 122 | 30 |
| Lead Strip | 178 | 27 | 1 | 465 | 465 | 2 | 0 | 0 | 13 | 5 | 11306 | 16 | 1 |
| Lag Strip | 91 | 28 | 2 | 224 | 224 | 3 | 1 | 0 | 15 | 5 | 16329 | 21 | 1 |
| Loaded Org. (E2) | n.a | 3 | 1 | 160 | 160 | 1 | 0 | 0 | 16647 | 0 | 15059 | 22 | 2 |
| Strip Org. (ST1) | n.a | 3 | 0 | 23 | 23 | 1 | 0 | 0 | 17000 | 0 | 7224 | 11 | 3 |

EXAMPLE 10

Pilot Plant Operation

The pilot plant operation was carried out with a device that involved two extraction cells, one scrub cell and four stripping cells. The effective volume of mixer and settler of each cell were 1.675 and 8.000 liter respectively. The stripping involved two stages: the lead strip with hydrolysis thickener overflow and lag stripping with 50 g/l $H_2SO_4$ respectively. The major operational conditional were as follows:

| | |
|---|---|
| Temperature: | 50° C. |
| Organic Composition: | 25% v/v Cyanex 923, 5% v/v Iso-tri-decanol and 70% v/v ShellSol D100A. The capacity of organic was 15.7 g/l Ti. |
| Feed Composition: | 36 g/l Ti, 410 g/l $H_2SO_4$, 47 g/l Fe including 4.0 g/l $Fe^{3+}$ |
| Mixing time: | 5-10 minutes |
| Settling time: | 40 minutes |
| O/A flow ratio of extraction: | ~5:1. |
| Organic flow: | 165 mL/min; |
| Feed flow: | 32 mL/min |
| O/A flow ratio of scrub: | ~10:1. |
| Org. flow: | 165 mL/min; |
| Aqu. flow: | 17 mL/min |
| O/A flow ratio of lead strip: | ~4:1. |
| Org. flow: | 165 mL/min; |
| Aqu. flow: | 41 mL/min |
| O/A flow ratio of lag strip: | ~8:1. |
| Org. flow: | 165 mL/min; |
| Aqu. Flow: | 21 mL/min |

The results are summarised in Table 8.

TABLE 8

Average Compositions of Aqueous and Organic Liquor

| | $H_2SO_4$ g/l | Ca mg/l | Cr mg/l | Tot. Fe g/l | $Fe^{3+}$ mg/l | Mg mg/l | Mn mg/l | Ni mg/l | P mg/l | Si mg/l | Ti mg/l | V mg/l | Zn mg/l |
|---|---|---|---|---|---|---|---|---|---|---|---|---|---|
| Feed | 415 | 83 | 45 | 49000 | 5200 | 450 | 1800 | 5 | 17 | 21 | 34000 | 350 | 30 |
| Raff | 363 | 65 | 29 | 29500 | 5000 | 340 | 1258 | 5 | 0 | 11 | 3950 | 115 | 29 |
| Lead Strip | 223 | 53 | 2 | 408 | 408 | 5 | 0 | 0 | 24 | 7 | 17167 | 28 | 1 |
| Lag Strip | 113 | 54 | 1 | 56 | 56 | 6 | 0 | 0 | 7 | 7 | 9300 | 14 | 1 |
| Loaded Org. (E2) | n.a | 15 | 1 | 177 | 177 | 0 | 0 | 0 | 19167 | 2 | 15917 | 23 | 3 |
| Stripped Org. (ST1) | n.a | 2 | 0 | 0 | 0 | 0 | 0 | 0 | 19750 | 1 | 10358 | 17 | 0 |

EXAMPLE 11

Batch Hydrolysis 1000 mL of SX pilot plant loaded strip liquor containing 123 g/l free $H_2SO_4$, 0 g/l $Fe^{2+}$, 0.26 g/l $Fe^{3+}$ and 12 g/l Ti was pretreated with 1 g of aluminium foil overnight at room temperature. Titration with dichromate with sodium diphenylamine sulfonate as indicator showed the resulting solution to contain 2.4 g/l $Ti^{3+}$. 500 mL of water containing 100 g/l free $H_2SO_4$, and 0.5 g of $TiO(OH)_2$ with sodium diphenylamine sulfonate as indicator showed the resulting solution to contain 2.4 g/l $Ti^{3+}$. 500 mL of water containing 100 g/l free $H_2SO_4$, and 0.5 g of $TiO(OH)_2$ seed, was preheated to 95° C., in a glass reactor equipped with baffles and a Teflon agitator. The treated loaded strip liquor was then pumped into the reactor at 2.8 mL/min over 6 hours. The reaction mixture was allowed to stir for a further 30 minutes then a sample was withdrawn and filtered. Analysis of the solution showed it to contain 147 g/l free $H_2SO_4$, 0.24 g/l Fe and 2.3 g/l Ti. The slurry was filtered, and the solids washed with water and dried. Filtration was found to be very fast. 22.6 g of residue were obtained in this way, containing 45.0% Ti, 3.9% S and <0.02% Fe with $d_{50}$ particle size approximately 8.5 micron.

EXAMPLE 12

Pilot Plant Hydrolysis

A single stage hydrolysis pilot plant was assembled, consisting of 2 stirred FRP tanks of 5 L capacity each, equipped with FRP double axial turbines, and silica jacketed electric immersion heaters. SX pilot plant loaded strip liquor containing 206 g/l free $H_2SO_4$, 0 g/l $Fe^{2+}$, 0.2 g/l $Fe^{3+}$ and 25 g/l Ti, was pumped into the first tank at a rate of 10 mL/min. The temperature was maintained at 95° C. in each tank. Water was added to the first tank to control the acidity to 140 g/l, requiring a flow of 8.5 mL/min. Additional water was added to the second tank at 5 mL/min to control the acidity to 100 g/l. Slurry was thence allowed to flow by gravity to a FRP thickener equipped with FRP rakes. Thickener overflow solution was collected and stored. The thickener underflow slurry was collected and filtered by vacuum filtration. Filtration of the underflow was found to be very fast. The $d_{50}$ particle size was found to be 7.2 micron. The pilot plant was operated continuously for 42 hours. During the final 30 hours of operation the average composition of the solution in each tank was as follows:

TABLE 9

Continuous Pilot Plant Hydrolysis Results

| | Free Acid g/l | Fe g/l | Ti g/l |
|---|---|---|---|
| Tank 1 | 136 | 0.13 | 4.6 |
| Tank 2 | 105 | 0.09 | 1.0 |
| Thickener overflow | 109 | 0.09 | 1.0 |

EXAMPLE 13

Laboratory Scale Calcination

A 2.6 g sample of dried $TiO(OH)_2$ produced according to Example 11 was calcined in an alumina crucible, using a muffle furnace at 1000° C. for 1 hour. On removal from the furnace the cooled calcine was found by XRF to contain 59.8% Ti, 0.07% Fe, <0.02% S and less than detection limit for Si, Al, Mn, Mg, Cr, V and Zn.

Many modifications may be made to the process of the present invention described above without departing from the spirit and scope of the present invention.

By way of example, whilst the above-described flow sheet describes that the Stage 1 and Stage 2 Leach steps are carried out in single digesters 3 and 13, respectively, the present invention is not so limited and extends to arrangements that include multiple digesters for each stage.

In addition, whilst the above-described flow sheet describes that the Stage 1 and Stage 2 Leach steps are carried out in separate digesters 3 and 13, respectively, the present invention is not so limited and extends to arrangements in which leaching of titaniferous material is carried out in a single digester, with return of residual solid phase to the digester and direct supply of raffinate from the solvent extraction step 9 to the digester.

The invention claimed is:

1. A sulfate process for producing titania from a titaniferous material which includes the steps of:
   (a) leaching the titaniferous material with a leach solution containing sulfuric acid and forming a leach liquor that includes an acidic solution of titanyl sulfate ($TiOSO_4$) and iron sulfate ($FeSO_4$);
   (b) separating the leach liquor and a residual solid phase from the leach step (a);
   (c) separating titanyl sulfate from the leach liquor from step (b) and using at least part of the leach liquor that remains after separation of the titanyl sulfate as part of the leach solution in one of the leach step (a) or a further leach step;
   (d) hydrolysing the separated titanyl sulfate and forming a selected particle size distribution of hydrated titanium oxides from titanyl sulfate;
   (e) separating the hydrated titanium oxides from a liquid phase that is produced in the hydrolysis step (d); and
   (f) calcining the solid phase from step (e) and forming titania.

2. The process defined in claim 1 further comprising controlling the hydrolysis step (d) to produce a selected particle size distribution of the hydrated titanium oxides product.

3. The process defined in claim 1 further comprising controlling the hydrolysis step (d) to produce coarse hydrated titanium oxides having a particle size of at least 0.005 mm.

4. The process defined in claim 1 further comprising controlling the hydrolysis step (d) to produce fine hydrated titanium oxides having a particle size of less than 0.0003 mm.

5. The process defined in claim 1 further comprising a further leach step of leaching the residual solid phase from step (b) with a leach solution containing sulfuric acid and forming a leach liquor that includes an acidic solution of titanyl sulfate and iron sulfate and a residual solid phase.

6. The process defined in claim 5 wherein the further leach step includes separating the leach liquor and the residual solid phase.

7. The process defined in claim 5 wherein the further leach step includes supplying the separated leach liquor to the leach step (a) and/or mixing the separated leach liquor with the leach liquor from step (b).

8. The process defined in claim 5 further comprising carrying out the leach step (a) and the further leach step in the same vessel.

9. The process defined in claim 8 further comprising returning the residual solid phase from step (b) to the vessel, wherein the residual solid phase forms part of the titaniferous material subjected to leaching in the leach step (a).

10. The process defined in claim 5 further comprising carrying out the leach step (a) and the further leach step in a separate vessel or vessels.

11. The process defined in claim 10 wherein the further leach step includes supplying the residual solid phase from step (b) to the vessel or vessels.

12. The process defined in claim 5 wherein the leach step (a) and/or the further leach step includes selecting and/or controlling the leach conditions in the leach step or steps to avoid undesirable amounts of premature hydrolysis of hydrated titanium oxides and undesirable amounts of premature precipitation of titanyl sulfate.

13. The process defined in claim 12 wherein the leach conditions include any one or more than one of acid concentration, leach temperature and leach time.

14. The process defined in claim 12 further comprising selecting and/or controlling the acid concentration to be at least 350 g/l sulfuric acid throughout the leach step (a) and/or the further leach step when operating at a leach temperature in the range of 95° C. to the boiling point in order to avoid premature hydrolysis.

15. The process defined in claim 12 further comprising selecting and/or controlling the acid concentration at the end of the leach step (a) and/or the further leach step to be less than 450 g/l when operating at a leach temperature in the range of 95° C. to the boiling point in order to avoid an undesirable amount of premature precipitation of titanyl sulfate.

16. The process defined in claim 12 further comprising selecting and/or controlling the leach conditions so that the titanium ion concentration in the leach liquor is less than 50 g/l in the leach liquor at the end of the leach step (a) and/or the further leach step.

17. The process defined in claim 16 further comprising selecting and/or controlling the leach conditions so that the titanium ion concentration in the leach liquor is 40-50 g/l in the leach liquor at the end of the leach step (a) and/or the further leach step.

18. The process defined in claim 5 further comprising carrying out the leach step (a) and/or the further leach step in the presence of a leaching accelerant that accelerates the rate of leaching the titaniferous material.

19. The process defined in claim 18 wherein the leaching accelerant is selected from the group consisting of iron, a titanium (III) salt, a thiosulfate salt, sulfur dioxide, a reduced sulfur containing species, and mixtures thereof.

20. The process defined in claim 5 further comprising carrying out the leach step (a) and/or the further leach step in the presence of a reductant that reduces ferric ions to ferrous ions in the acidic solution or solutions of titanyl sulfate and iron sulfate produced in the leach step (a).

21. The process defined in claim 20 wherein the reductant is selected from the group consisting of iron, a titanium (III) salt, a thiosulfate salt, sulfur dioxide, a reduced sulfur containing species, and mixtures thereof.

22. The process defined in claim 1 further comprising the steps of precipitating iron sulfate from the leach liquor from step (b) and separating precipitated iron sulfate from the leach liquor prior to the titanyl sulfate separation step (c).

23. The process defined in claim 1 wherein the titanyl sulfate separation step (c) includes a solvent extraction step of extracting titanyl sulfate from the leach liquor from step (b) into a solvent and thereafter stripping titanyl sulfate from the solvent and forming a solution that contains titanyl sulfate and thereafter hydrolysing the titanyl sulfate-containing solution in the hydrolysis step (c).

24. The process defined in claim 23 further comprising using at least part of a raffinate from the solvent extraction step as at least part of the leach solution in leach step (a) and/or in the further leach step.

25. The process defined in claim 24 wherein the leach solution in the leach step (a) and the further leach step includes the raffinate and make-up fresh sulfuric acid.

26. The process defined in claim 24 wherein the raffinate from the solvent extraction step has an acid concentration of at least 250 g/l sulfuric acid.

27. The process defined in claim 23 wherein the solvent extraction step includes contacting the leach liquor with the solvent and a modifier.

* * * * *